US012583326B2

(12) United States Patent
Wulf et al.

(10) Patent No.: US 12,583,326 B2
(45) Date of Patent: Mar. 24, 2026

(54) FLEET AND TROLLEY SYSTEM FOR ZERO-EMISSION MACHINES

(71) Applicant: Caterpillar Inc., Peoria, IL (US)

(72) Inventors: Stefan J. Wulf, Washington, IL (US); Cameron T. Lane, Oro Valley, AZ (US); Daniel J. Organ, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1128 days.

(21) Appl. No.: 17/557,788

(22) Filed: Dec. 21, 2021

(65) Prior Publication Data

US 2023/0191915 A1    Jun. 22, 2023

(51) Int. Cl.
B60L 9/00 (2019.01)
B60L 53/14 (2019.01)
(Continued)

(52) U.S. Cl.
CPC .................. B60L 9/00 (2013.01); B60L 53/14 (2019.02); B60L 53/53 (2019.02); B60L 53/63 (2019.02);
(Continued)

(58) Field of Classification Search
CPC ............. B60L 2200/40; B60L 2200/36; B60L 2200/30; B60L 50/53; B60L 53/14;
(Continued)

(56) References Cited

U.S. PATENT DOCUMENTS

| | | | |
|---|---|---|---|
| 8,829,853 B2 | 9/2014 | Hill et al. |
| 8,893,830 B2 | 11/2014 | Ruth |

(Continued)

FOREIGN PATENT DOCUMENTS

| | | |
|---|---|---|
| EP | 3231689 A2 | 10/2017 |
| KR | 1020190090396 A | 8/2019 |

(Continued)

OTHER PUBLICATIONS

Written Opinion and International Search Report for Int'l. Patent Appln. No. PCT/US2022/051799, mailed Apr. 20, 2023 (9 pgs).

(Continued)

*Primary Examiner* — Zachary L Kuhfuss
(74) *Attorney, Agent, or Firm* — von Briesen & Roper, s.c.

(57) ABSTRACT

A fleet and trolley system, a first method of charging a work machine, and a second method of charging a fleet of work machines are disclosed. The fleet and trolley system includes a trolley network, at least one zero-emission work machine, and a controller. The controller manages a scheduled usage of the trolley network, a power draw, and a distribution of the power draw by the work machine. The first method includes monitoring states of the work machine, scheduling a usage of the trolley network, and supplying electric power to the work machine. The second method includes monitoring states of a fleet, monitoring states of the trolley network, scheduling usages of the trolley network, and supplying electric power to one or more machines of the fleet. Advantageously, the disclosed system and methods may improve an efficiency, productivity, and longevity of a fleet of zero-emission work machines.

24 Claims, 5 Drawing Sheets

(51) Int. Cl.

| | |
|---|---|
| *B60L 53/53* | (2019.01) |
| *B60L 53/63* | (2019.01) |
| *B60L 53/68* | (2019.01) |
| *B60L 58/12* | (2019.01) |
| *B60L 58/16* | (2019.01) |
| *B60L 58/30* | (2019.01) |
| *B60M 7/00* | (2006.01) |

(52) U.S. Cl.

CPC .............. *B60L 53/68* (2019.02); *B60L 58/12* (2019.02); *B60L 58/16* (2019.02); *B60L 58/30* (2019.02); *B60M 7/00* (2013.01); *B60M 7/003* (2013.01); *B60L 2200/36* (2013.01); *B60L 2200/40* (2013.01); *B60L 2200/44* (2013.01); *B60L 2240/622* (2013.01); *Y02T 10/70* (2013.01); *Y02T 10/7072* (2013.01); *Y02T 90/16* (2013.01)

(58) Field of Classification Search

CPC .......... B60L 53/53; B60L 53/63; B60L 53/68; B60L 55/00; B60L 5/36; B60L 9/00; B60L 5/24; B60L 58/12; B60L 58/13; B60L 58/16; B60L 58/30; B60L 2240/62; B60L 2260/54; B60M 7/00; B60M 1/36; B60M 7/003; Y02T 10/70; Y02T 10/7072; Y02T 10/72; Y02T 90/16

See application file for complete search history.

(56) References Cited

U.S. PATENT DOCUMENTS

| | | | |
|---|---|---|---|
| 9,008,879 B2 | 4/2015 | Kumar et al. | |
| 9,452,679 B2 | 9/2016 | Kikuchi et al. | |
| 9,835,463 B2 | 12/2017 | Takahashi | |
| 10,115,247 B2 | 10/2018 | Alm et al. | |
| 10,286,787 B2 | 5/2019 | Mazumdar | |
| 10,286,804 B2 * | 5/2019 | Huff ....................... | B60L 55/00 |
| 10,532,663 B2 | 1/2020 | Ricci | |
| 10,632,852 B2 | 4/2020 | Ricci | |
| 10,919,395 B2 | 2/2021 | Tsutsumi | |
| 2013/0144472 A1 | 6/2013 | Ruth et al. | |
| 2014/0032006 A1 * | 1/2014 | Tojima .................. | B60L 3/0046 700/295 |
| 2014/0032061 A1 * | 1/2014 | Wulf ..................... | E02F 9/2025 701/51 |
| 2015/0090554 A1 | 4/2015 | Mazumdar | |
| 2015/0321565 A1 * | 11/2015 | Kikuchi .................. | B60L 50/61 701/22 |
| 2018/0111496 A1 | 4/2018 | Cholewa et al. | |
| 2022/0118859 A1 * | 4/2022 | Worley ..................... | B60L 7/18 |
| 2023/0069171 A1 * | 3/2023 | Sanchez .................. | B60R 11/04 |
| 2023/0166632 A1 * | 6/2023 | Braunstein ........... | G01R 31/382 320/109 |
| 2023/0168696 A1 * | 6/2023 | Lane ....................... | B60L 58/13 701/25 |
| 2023/0186191 A1 * | 6/2023 | Lane ....................... | G06Q 10/06 705/7.13 |
| 2023/0194281 A1 * | 6/2023 | Lane ....................... | G06Q 10/20 |
| 2023/0196846 A1 * | 6/2023 | Braunstein ............. | G07C 5/006 |

FOREIGN PATENT DOCUMENTS

| | | | | |
|---|---|---|---|---|
| WO | 2010121707 A1 | 10/2010 | | |
| WO | 2012118422 A1 | 9/2012 | | |
| WO | 2012153755 A1 | 11/2012 | | |
| WO | 2014125717 A1 | 8/2014 | | |
| WO | WO-2023126521 A1 * | 7/2023 | .............. | B60L 58/12 |

OTHER PUBLICATIONS

Jon Porter, "Germany Tests Overhead Wires to Charge Hybrid Trucks on Highways", The trolleysbus reborn, May 9, 2019, The Verge.

Marissa Moultak, et al., "Transitioning to Zero-emission Heavy-duty Freight Vehicles", The International Council On Clean Transportation, Sep. 2017, White Paper.

* cited by examiner

500

FLEET AND TROLLEY SYSTEM FOR ZERO-EMISSION MACHINES

TECHNICAL FIELD

The present disclosure generally relates to systems for managing a fleet of work machines and, more specifically, to a system for managing a fleet of zero-emission work machines and optimizing their power usage of a trolley network.

BACKGROUND

Fleets of work machines are employed in a variety of applications ranging from mining and earth moving operations to construction projects and agriculture harvesting. Often, each vehicle within the fleet may communicate with one another and/or may be directed by a central planner, such as a management station. The central planner may, for example, assign tasks and schedules, allocate resources, coordinate fleet movement, and generally aim to improve a productivity of the operation in question.

In certain applications, a trolley network may be implemented to provide supplementary electric power to the fleet. For example, the fleet may comprise diesel-electric vehicles which utilize an internal combustion engine and electric traction motors capable of being directly powered by electric current. In the same example, a trolley line may be strategically installed on an uphill segment of a mining site; and one or more work machines may draw power from the trolley line while traveling across said segment. Accordingly, the central planner may plan a usage of the trolley network and/or may allocate power to each connected machine.

More recently, innovations to vehicle powertrains and battery technology have enabled electric work machines which reduce or altogether remove greenhouse gases (GHG) from their operation. For example, a 'GHG-free', 'zero-emission', or 'emission-free' work machine may be powered by electric batteries or utilize fuel cells in combination with batteries as an alternative energy source to carbon-based fuels. However, such vehicles are often limited in range by their energy storage capacity and may require longer refuel times, potentially stymieing fleet productivity. The aforementioned trolley network may thus be particularly beneficial to fleets of zero-emission vehicles. When connected, the trolley network may not only drive the movement of the work machine, it may concurrently charge its battery as well, thereby extending the vehicle's range and uptime.

While the prior art has disclosed power management systems for fleets of diesel-electric work machines, the prior art has failed to provide adequate fleet and trolley management systems for zero-emission vehicles, which demand unique logistical considerations.

One example of prior art may be found in Publication WO/2012/153755 invented by Tojima et al. and assigned to Komatsu Ltd. Tojima discloses a power management system for a mining operation, the system comprising a first and second overhead line disposed on ascending and descending slopes of a mine site, respectively. The system may further comprise one or more transport vehicles, each powered by an internal combustion engine and/or external power from the overhead lines. Finally, a management device may control the distribution of power between the one or more vehicles (via the overhead lines and a power supply/storage unit) such that a total quantity of power consumed by the vehicles on the ascending slopes does not exceed a total quantity of power generated on the descending slopes.

However, the management system disclosed by Tojima is primarily designed to propel, and not to charge, diesel-electric vehicles. In contrast, zero-emission vehicles have the potential to be both driven and recharged by a trolley network. Tojima thus fails to disclose a power distribution strategy for its transport vehicles between at least those two functions. Moreover, Tojima is primarily concerned with budgeting the power consumption among its machines, and fails to strategize along other management criteria.

Accordingly, there remains a need in the art for a system of managing a fleet of zero-emission work machines and an associated trolley network that considers not only the power consumption of each vehicle, but that considers the power consumption, scheduling, efficiency, productivity, and longevity of the fleet as a whole.

SUMMARY OF THE DISCLOSURE

According to a first aspect of the present disclosure, a fleet and trolley system is disclosed. The system comprises a trolley network configured to connect to and supply electric power to one or more work machines, the trolley network including a first terminus, a second terminus, and a contact line. The system further comprises a zero-emission work machine configured to intermittently connect to and draw electric power from the trolley network, the work machine including a frame, a rechargeable battery, one or more propulsion motors, a tractive device, a charging apparatus, a positioning module, and a first communication module. The system further comprises a controller in operative communication with the work machine. The controller is configured to manage a scheduled usage of the trolley network by the work machine, a power draw by the work machine from the trolley network, and a distribution of the power draw between charging the rechargeable battery and driving the tractive device.

According to a second aspect of the present disclosure, a method of charging a work machine via a trolley network is disclosed. The method comprises monitoring a plurality of states of the work machine, the plurality of states including a type, a state of charge of a rechargeable battery, a location, and one or more assigned tasks. The method comprises scheduling a usage of the trolley network by the work machine based on the plurality of states. And the method comprises supplying electric power from the trolley network to the work machine, including allocating a power draw by the work machine and distributing the power draw between charging the rechargeable battery and driving a tractive device. Each step of the method is operatively performed by a controller included on the work machine.

According to a third aspect of the present disclosure, a method of charging a fleet of work machines via a trolley network is disclosed. The method comprises monitoring a plurality of states of the fleet and monitoring a plurality of states of the trolley network. The method comprises scheduling a usage of the trolley network by one or more work machines based on the plurality of states, including prioritizing one or more work machines and relegating one or more work machines. Finally, the method comprises supplying electric power from the trolley network to the connected work machines, including allocating a power draw by each connected work machine and distributing each power draw between charging a rechargeable battery and driving a tractive device of each work machine.

These and other aspects and features of the present disclosure will be more readily understood after reading the following description in conjunction with the accompanying drawings.

DETAILED DESCRIPTION

Figure 1:
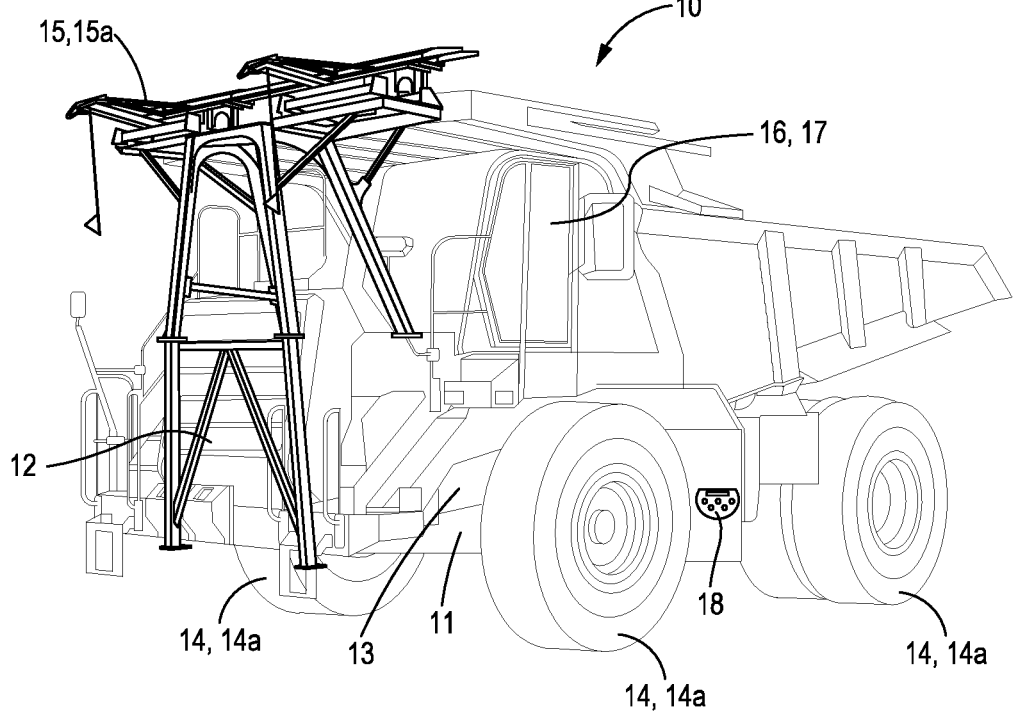
FIG. 1 is a diagram of a work machine according to an embodiment of the present disclosure.

Referring now to the drawings and with specific reference to FIG. 1, a diagram of a work machine is generally referred to by a reference numeral 10. While the work machine 10 is depicted as a large mining truck, it may alternatively be an excavator, front loader, motor grader, bulldozer, or comparable machine employed in mining, earth moving, construction, and/or agricultural applications. The work machine 10 may comprise a frame 11, a rechargeable battery 12, one or more propulsion motors 13, a tractive device 14, a charging apparatus 15, a positioning module 16, and a first communication module 17.

The work machine 10 may be a zero-emission vehicle. In an embodiment, the work machine 10 may be a battery electric vehicle 10a being powered exclusively by the rechargeable battery 12 and driven by the one or more propulsion motors 13 (when disconnected from external power sources). The rechargeable battery 12 may be a lead-acid battery, a lithium-ion battery, or a nickel metal hydride battery; or may employ another battery chemistry and/or topology common to the art. In an embodiment, the rechargeable battery 12 may be charged through a vehicle inlet 18. The vehicle inlet 18 may interface with a standard connector, such as one defined by IEC 62196 standards; or the vehicle inlet 18 may require a proprietary connector, depending on specific applicational requirements. Moreover, the rechargeable battery 12 may be charged through the charging apparatus 15 while the work machine 10 is connected to a trolley network 20, which will be discussed in greater detail below.

The one or more propulsion motors 13 may be traction motors in the form of DC series motors, AC series motors, AC induction motors, or synchronous motors; or may employ other common motor designs for converting electric power to mechanical torque. No limitation is intended herein for the number or specification of the propulsion motors 13, which may depend on the tractive device 14 and the operational requirements of the machine 10. The work machine 10 may also comprise a powertrain for transferring electrical power from the rechargeable battery 12 (or from external sources) to the propulsion motors 13. Finally, the tractive device 14 may include the wheels and tires 14a as shown, or may employ alternative equipment, such as tracks, treads, and the like, in order to propel the work machine 10.

In another embodiment, the work machine 10 may be a fuel cell electric vehicle 10b, such as a hydrogen vehicle, being powered exclusively by a fuel cell and the rechargeable battery 12 (when disconnected from external power sources). In such embodiments, the fuel cell may be the primary power source for driving the propulsion motors 13, while the rechargeable battery 12 may be configured to provide starter power to the fuel cell, capture energy from regenerative braking, supply supplemental power during high-performance applications, and/or power accessories of the work machine 10, among other possibilities. Similar to the battery electric vehicle 10a, the fuel cell electric vehicle 10b, and more specifically the rechargeable battery 12 of the vehicle 10b, may be charged by the trolley network 20 through the charging apparatus 15, but may require different power allocations and management strategies, which will be discussed in greater detail below.

The positioning module 16 may be configured to identify a location of the work machine 10, which may be communicated to a controller 30 or a fleet controller 30a, which will be discussed in greater detail below. In particular, the positioning module 16 may be a global positioning system, such as a global navigation satellite system, the eponymous Global Positioning System (GPS), or employ comparable technologies. In other embodiments, the positioning module 16 may be a local positioning system, such as one employing cellular base stations, radio broadcast towers, time of flight technology, trilateration techniques, optical trackers, and yet other possibilities. The positioning module 16 may be configured to relate a distance between the work machine 10 and the trolley network 20 and/or assist in navigating the work machine 10 to the trolley network 20 and other key locations.

The first communication module 17 may be configured to communicate a plurality of states of the work machine 10, including the aforementioned location, to the controller 30 or the fleet controller 30a. In various embodiments, the first communication module 17 may employ short-range or medium-range wireless communication protocols; may employ Wi-Fi, Bluetooth, cellular, and/or radio technologies; and/or may utilize other communication technologies common to the art. In an embodiment, the first communication module 17 may enable bi-directional communication with the controller or fleet controller 30a. More specifically, the work machine 10 may relay the plurality of states to the controller 30, 30a and may receive instructions from the controller 30, 30a for scheduling, navigating to, connecting to, and drawing power from the trolley network 20.

Figure 2:
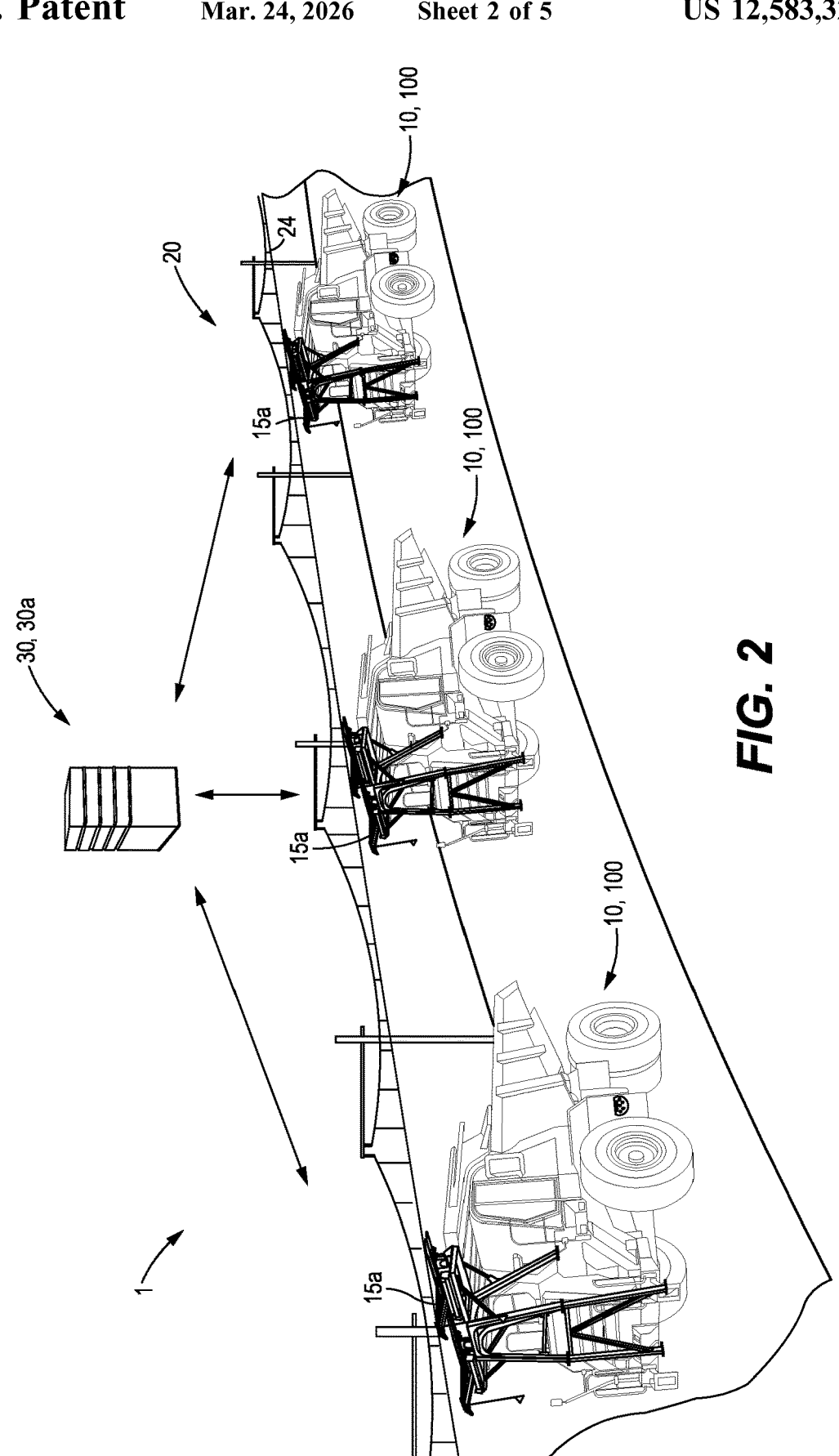
FIG. 2 is a schematic of a fleet and trolley system according to an embodiment of the present disclosure.

Turning now to FIG. 2, a diagram of a fleet and trolley system is generally referred to by a reference numeral 1. The system 1 may comprise the work machine 10, a trolley network 20, and a controller 30. In an embodiment, the system 1 may further comprise a plurality of zero-emission work machines 10 and the controller 30 may further include the fleet controller 30a. Each work machine 10 may be configured to intermittently connect to and draw electric power from the trolley network 20. Likewise, the trolley network 20 may be configured to connect to and supply electric power to one or more work machines 10 concurrently; and may supply power to each of the plurality of work machines 10 over time.

In an embodiment, the plurality of zero-emission work machines 10 may be part of a fleet 100. The fleet 100 may include only zero-emission work machines 10, or it may further include one or more diesel-electric vehicles (not shown) or other vehicles and machinery which are also capable of drawing electric power from the trolley network

5

20. Accordingly, the trolley network 20 may be configured to connect to and supply electric power to the one or more diesel-electric vehicles concurrently, which may or may not be concurrent with the usage by the zero-emission work machines 10. The management strategies for the diesel-electric vehicles will not be a focus of the present disclosure.

Figure 3:
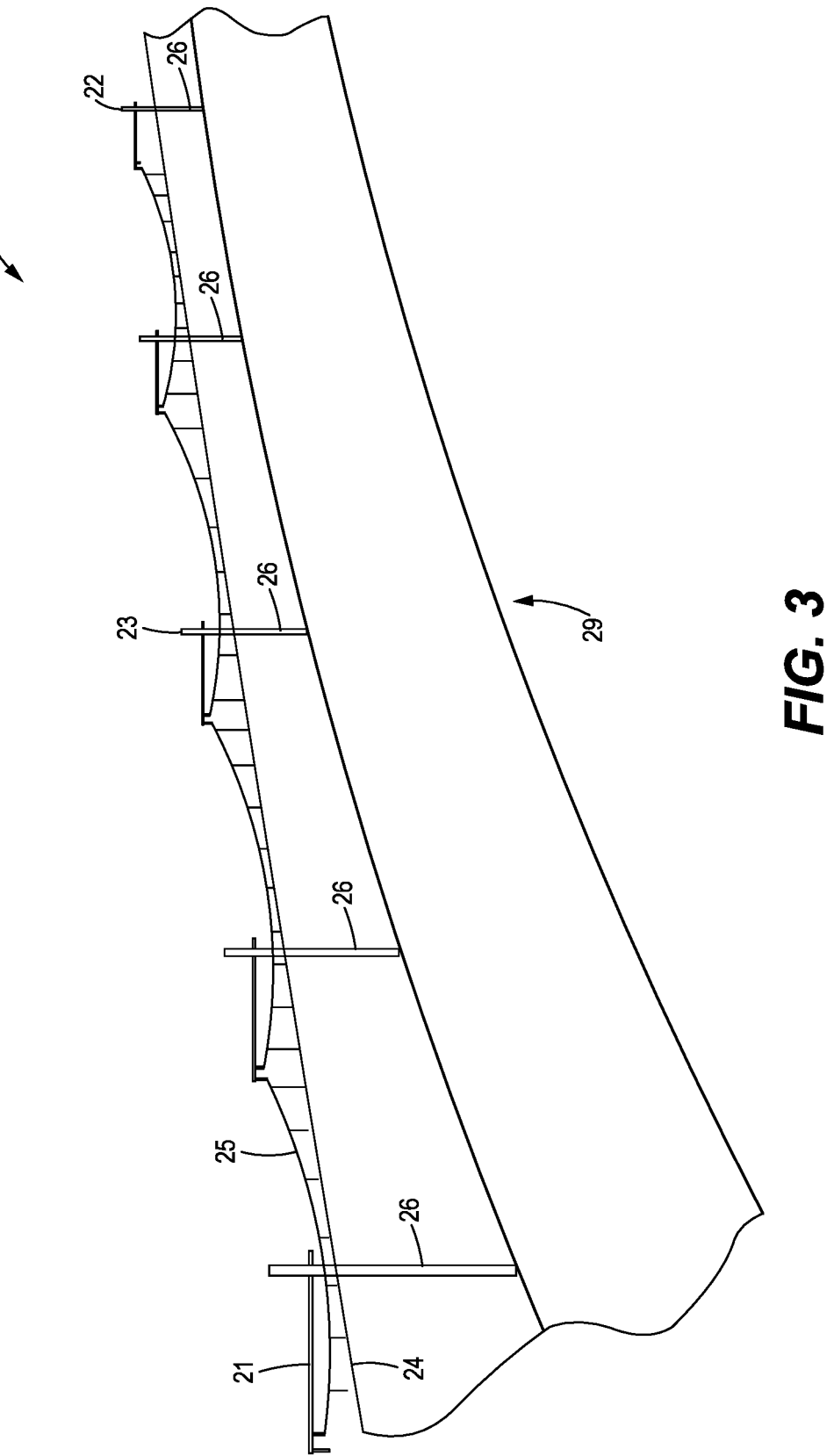
FIG. 3 is a diagram of a trolley network according to an embodiment of the present disclosure.

With reference now to FIG. 3, the trolley network 20 may include a first terminus 21 and a second terminus 22, which define a route 29 of the network 20; and one or more contact lines 24 which span the route 29. In various examples, the trolley network 20 may be placed on an uphill segment of a mining site, a strategic route of a construction zone, or a harvesting path of a plantation. However, no limitation is intended herein for the placement, length, or elevation change exhibited by the trolley network 20. It is further worth noting that the trolley network 20 depicted in FIG. 3 is exemplary in nature, and is not intended to restrict the design or form of the trolley network 20.

In an embodiment, a work machine 10 may only enter or exit and/or connect to or disconnect from the trolley network 20 at either terminus 21, 22. Accordingly, any machine 10 using the trolley network 20 to draw electric power may need to travel the entire route 29. In other embodiments, the trolley network 20 may further include one or more terminals 23 located along the route 29 between the first terminus 21 and the second terminus 22, wherein any machine 10 may enter or exit and/or connect to or disconnect from the trolley network 20 at any terminal 21, 22, 23. And in yet other embodiments, a work machine may enter or exit and/or connect to or disconnect from the trolley network 20 at any point along the route 29 between the first terminus 21 and the second terminus 22. In some configurations, the trolley network 20 may operate in a single direction only, wherein an associated work machine 10 may only travel in a single direction along the route 29. And in other configurations, the trolley network 20 may operate bidirectionally and/or may include multiple lanes for parallel charging.

In an exemplary embodiment, the contact lines 24 may include DC power lines operatively receiving electric power from a local substation (not shown). In the same or other embodiments, the contact lines 24 may be physically supported by one or more catenaries 25 of the trolley network 20. In turn, the catenaries 25 may be carried by support poles 26 placed at intervals across the route 29. In such configurations, the charging apparatus 15 of each work machine 10 may include a pantograph 15a configured to controllably draw current from the contact lines 24. For example, the pantograph 15a may be spring-loaded and drive one or more carbon brushes into contact with the DC power lines. It may be understood that the catenaries 25, contact lines 24, and charging apparatus 15 are designed to interface with one another, including considerations for machine height, connection type, current type, voltage and/or current levels, etc.

In other embodiments, other designs for the trolley network 20 are also possible and envisioned, such as but not limited to designs employing trolley poles, bow collectors, underbody collectors, and other forms of 'live' electricity transfer. For example, the trolley network 20 may alternatively include a ground-level power supply, wherein the one or more contact lines 24 may include conductive rails or tracks; and the charging apparatus 15 may include an underbody collector 15b configured to interact therewith. And in other embodiments, the trolley network 20 may include non-contact conductors, such as those facilitating in-road inductive charging. Indeed, the contact lines 24 may embody any form of 'live' electricity supply and the associated charging apparatus 15 may embody any form of 'live' electricity receipt, depending on specific applicational requirements.

Returning now to FIG. 2, the controller 30 may be in operative bi-directional communication with a single work machine 10. The controller 30 may be configured to manage: a scheduled usage of the trolley network 20 by the work machine 10, a power draw by the work machine 10 from the trolley network 20; and a distribution of the power draw between charging the rechargeable battery 12 and driving the tractive device 14.

In an embodiment, the controller 30 may further include a fleet controller 30a in operative bi-directional communication with each work machine 10 within the fleet 100. Likewise, the fleet controller 30a may be configured to manage: a scheduled usage of the trolley network 20 by each work machine 10, a power draw by each work machine 10 from the trolley network 20, and a distribution of the power draw of each work machine 10 between charging the rechargeable battery 12 and driving the tractive device 14. In other words, the controller 30 may manage a single work machine 10 and the fleet controller 30 may manage the fleet 100. Each of the above scheduling and charging processes will be discussed in greater detail below.

In some embodiments, the controller 30 may be included on the work machine 10, e.g. in the form of an onboard computer, an engine control unit, a battery management system, and the like. In the same or other embodiments, the work machine 10 may operate independently and may manage its own usage of the trolley network 20. In other embodiments, the controller 30 may be located external to the machine 10 and may communicate with the machine 10 through the first communication module 17.

In those embodiments comprising a fleet 100 of zero-emission work machines 10, the fleet controller 30a may be located external to the fleet 100 and may communicate with each machine 10 through each machine's first communication module 17. Accordingly, each work machine 10 may not necessarily operate independently and may be centrally managed by the fleet controller 30a. In the same or other embodiments, the fleet controller 30a may be remotely located, e.g. in a management station; may be located on the trolley network 20, e.g. in the form of a control panel, a human-machine interface, an embedded computer, etc.; may be located on a single work machine 10 within the fleet 100, e.g. in the form of an onboard computer, an engine control unit, a battery management system, etc.; or may even be a distributed across each machine 10 or diesel-electric vehicle 102 of the fleet 100, e.g. in the form of a distributed computer.

In an embodiment, the fleet controller 30a may include at least a processor 31, a memory 32 in the form a non-transitory computer-readable medium, and a second communication module 33 enabling bi-directional communication with at least the first communication module 17.

With continued reference to FIG. 2, the controller 30 may monitor one or more states of the work machine 10, optimize for one or more predetermined criteria, schedule a usage of the trolley network 20 by the work machine 10, and manage the power usage of the trolley network 20 by the work machine 10. Likewise, the fleet controller 30a may monitor one or more states of each work machine 10, optimize for one or more predetermined criteria, schedule usages of the trolley network 20 by each machine 10, and manage the power usages of the trolley network 20 by each work machine 10.

More specifically, the controller 30 may monitor a type of the work machine 10, e.g. its make, model, fuel type, powertrain, tractive device 14, etc.; a state of charge of the rechargeable battery 12; a location of the work machine 10; and one or more assigned tasks of the work machine 10. In some embodiments, the controller 30 may further monitor a state of health of the rechargeable battery 12; a priority of the assigned tasks; and yet other possible states, where no limitation is intended by the present disclosure. And in other embodiments where the work machine 10 is the fuel cell electric vehicle 10b, the controller 30 may monitor a fuel cell fuel level, e.g. a quantity or percentage of hydrogen gas remaining in the tank. Similarly, the fleet controller 30a may monitor the above states for each work machine 10 of the fleet 100. Furthermore, the controller 30 or fleet controller 30a may monitor one or more states of the trolley network 20, such as a count of the presently connected work machines 10, a power draw of each connected work machine 10, and a saturation of the trolley network 20.

And in yet other embodiments, the controller 30 or fleet controller 30a may further monitor one or more diesel-electric vehicles and/or other vehicles and machinery associated with the trolley network 20. In such embodiments, the states of the trolley network 20 may include a count of the presently connected diesel-electric vehicles 102 (or other connected vehicles); and/or a power draw of each connected diesel-electric vehicle 102 (or other connected vehicles). Indeed, no limitation is intended herein for the type or number of states of the trolley network 20 being monitored by the controller 30 or fleet controller 30a.

Finally, the controller 30 may manage the work machine 10 by optimizing for a number of predetermined criteria, which may include, without limitation, an energy efficiency, a productivity, and/or a depreciation of the work machine 10. Likewise, the fleet controller 30a may manage one or more work machines 10 and/or the fleet 100 by optimizing for a number of predetermined criteria, which may include, without limitation, an energy efficiency, a productivity, and/or a depreciation of each work machine 10, one or more work machines 10, and/or the fleet 100 as a whole. Various management strategies dictating the usage of the trolley network 20 by each work machine 10 and/or the plurality of work machines 10 are discussed in greater detail below.

INDUSTRIAL APPLICATION

The present disclosure may find industrial applicability toward work machines and their associated charging networks, and may be particularly useful toward fleets of zero-emission work machines being charged by a trolley network.

For example, the present disclosure may be applied to a work machine, such as a large mining truck, excavator, backhoe, bulldozer, grader, trencher, tractor, front loader, and yet other possibilities. The work machine may specifically be a zero-emission vehicle, such as one being powered exclusively by electric batteries or hydrogen fuel cells (when disconnected from external power sources). The work machine may operate independently, i.e. may self-manage its power usage of the trolley network; or the work machine may be centrally managed, i.e. by the controller.

Moreover, the present disclosure may be applied to a fleet of zero-emission work machines. For example, a plurality of work machines may be employed collectively on an open-pit mine, a road construction work zone, a farm or ranch, and yet other possible work sites. The fleet may include a plurality of zero-emission work machines being supplied electric power through the trolley network. Moreover, the present disclosure may be applied to a fleet which includes zero-emission vehicles, diesel-electric vehicles, and other vehicles capable of being supplied electric power through a trolley network. Advantageously, an existing management system for a fleet of diesel-electric vehicles may be modified with the systems and methods disclosed herein to include zero-emission vehicles.

Finally, the present disclosure may be applied to a trolley network, such as one employing overhead wires, ground-level power supplies, non-contact conductors or in-road inductive charging, railway electrification technologies, and yet other possible forms of live-electricity transfer. The trolley network may be powered through independent power generation mechanisms, and/or may transfer electric power from external sources.

Advantageously, the present disclosure may enable an optimized power usage of the trolley network by a single work machine and/or by the plurality of work machines; and may improve a productivity, an energy efficiency, and a longevity of each machine, one or more work machines, and/or the fleet as a whole.

First, the presently disclosed systems and methods may improve the productivity of a single work machine. By managing the supply of electric power through the trolley network, a work machine may reduce a quantity of time spent at charging stations, may increase an operating range, and may increase an operating uptime. The productivity of the work machine may further be improved by supplementing electrical power to the tractive device, thereby increasing the machine's travel speed and reducing a travel time between tasks.

Next, the presently disclosed systems and methods may improve the energy efficiency of a single work machine. Electric power supplied directly from the trolley network to the propulsion motors may avoid inefficiencies stemming from charging or discharging the battery, powertrain energy conversion, heat loss, etc. Moreover, electric power supplied by the trolley network may offer economies of scale and may be transported at advantageous ratings with regard to power loss. Finally, where fuel cell electric vehicles are concerned, consumption of electricity through the trolley network may be substantially cheaper than consumption of hydrogen fuel, and may provide increased range between refueling.

Further, the presently disclosed systems and methods may improve the battery health and/or longevity of a single work machine. The power usage of the trolley network may be managed such that the machine's battery remains within healthy state of charge limits, such that the battery is charged or discharged at favorable rates, such that the battery is operated within safe temperature ranges, and/or such that a lifetime number of charging cycles is reduced. With regard to component life, the work machine may be directed to travel at favorable speeds and/or may reduce powertrain usage when connected to the trolley network. Finally, where fuel cell electric vehicles are concerned, the fuel cell may be powered-off or idled when the machine is connected to the trolley network, further lengthening component longevity.

Perhaps more importantly, the present disclosure may extend each of the above advantages toward a plurality of work machines or an entire fleet of work machines. By following the various methods disclosed herein, the fleet and trolley system can optimize for a productivity, an efficiency, and/or a longevity of a single work machine, of one or more work machines, or of the entire fleet as a whole. Individual work machines within the fleet may be prioritized, such as by receiving greater allocations of power to their batteries or to their tractive device.

Finally, the present disclosure may improve the logistical operations of the fleet and the trolley network. By managing the schedule of each work machine and its speed of travel across the trolley network, the present disclosure may reduce 'congestion' along the route of the trolley network, may better align the schedule of each machine with its assigned tasks, may guarantee that each machine is sufficiently charged for its assigned tasks, may improve collaboration between machines having shared tasks, may stabilize the power output or saturation of the trolley network, and yet other possibilities.

Figure 4:
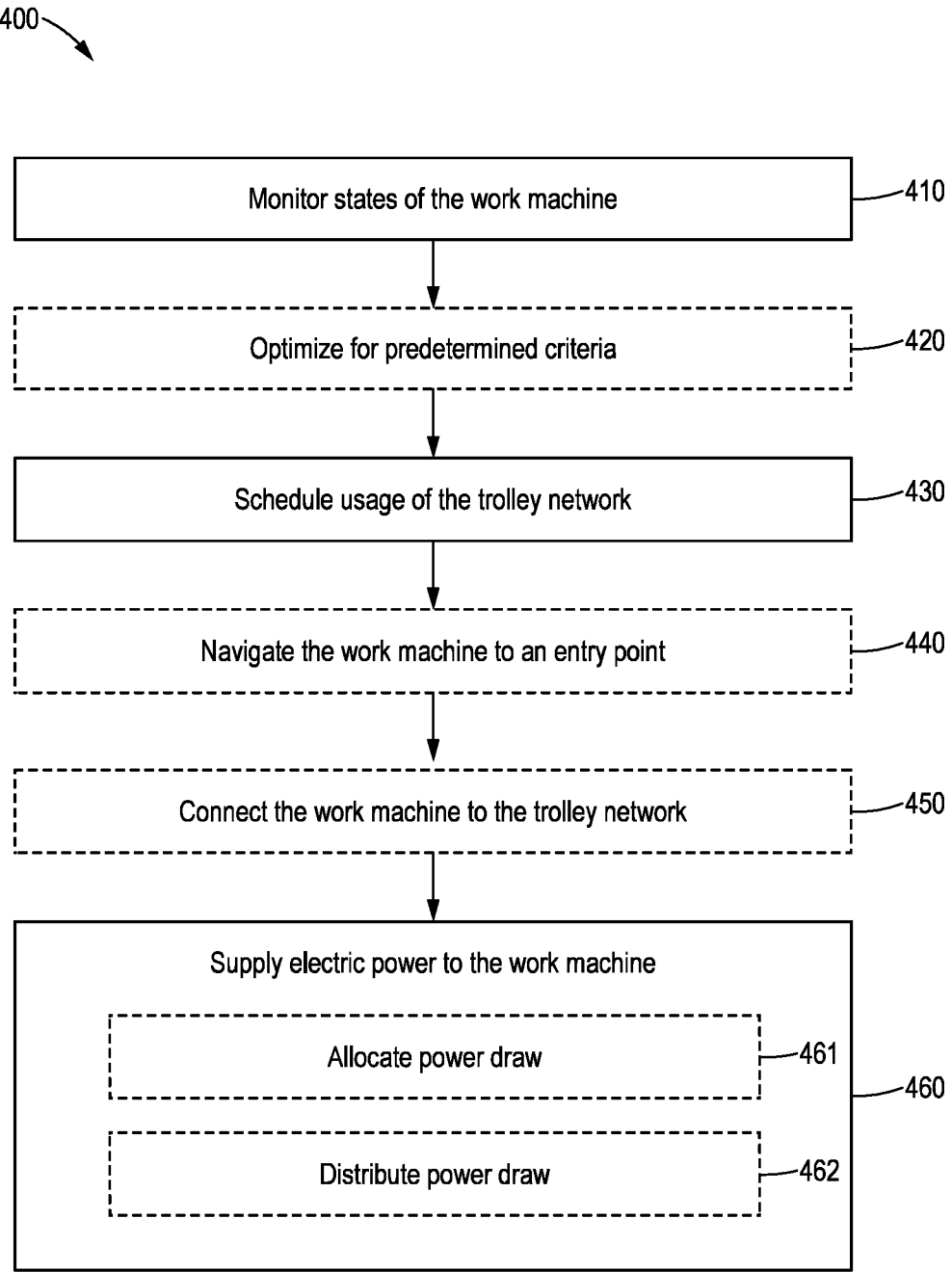
FIG. 4 is a flowchart illustrating a method of charging a work machine via a trolley network according to an embodiment of the present disclosure.

Turning now to FIG. 4, a method of charging a work machine via a trolley network is generally referred to by a reference numeral 400. It may be understood that the method 400 and FIG. 4 relate to a process of charging a single zero-emission work machine, while the method 500 and FIG. 5 relate to a process of charging a fleet of zero-emission work machines, which will be discussed further below. As seen in FIG. 4, the method 400 comprises monitoring a plurality of states of the work machine (step 410); scheduling a usage of the trolley network by the work machine (step 430); and supplying electric power from the trolley network to the work machine (step 460).

In some embodiments, each step of the method 400 may be operatively performed by the controller. In the same or other embodiments, the controller may be included on the work machine. Accordingly, the method 400 may be operatively performed by the work machine itself, which effectively self-manages its scheduling and power usage of the trolley network. In other embodiments, however, the controller may be located external to the work machine and may communicate with the work machine through the first communication module and the second communication module. In such embodiments, the method 400 may be operatively performed externally, e.g. by a central planner, which may or may not manage other work machines concurrently.

In step 410, a plurality of states of the work machine are monitored, including at least a type, a state of charge of its rechargeable battery, a location, and one or more assigned tasks. The type may include the make, model, or category of machine; its prime mover; its power train; its tractive device; and yet other defining characteristics, which may impact a charging strategy for the machine. In various embodiments, the assigned tasks may include basic logistical information, such as a location and start time of one or more jobs, but may include additional information, such as but not limited to expected energy consumption, expected duration, expected depreciation, etc. In other embodiments, the plurality of states may further include a state of health of the rechargeable battery, a priority of the assigned tasks, and/or a fuel cell fuel level (if the work machine is a fuel cell electric vehicle), although no limitation is intended herein for the total type or number of states being monitored.

Where applicable, the above plurality of states may be relayed to the controller through the first communication module of the work machine and the second communication module of the controller, for example, through a Wi-Fi connection, Bluetooth pair, radio communication, or other technology common to the art. In various embodiments, the monitored states may be transferred in real-time or at predetermined intervals, depending on applicational requirements.

In step 430, the work machine is scheduled to use the trolley network based on the plurality of states. The scheduled usage may include an entry time, an exit time, and, consequently, a speed of travel throughout the route of the trolley network. A number of exemplary strategies for the scheduling process are provided below.

In a first example, the work machine may be scheduled based on a function of state of charge of the battery. In an embodiment, a battery near depletion may be scheduled for immediate charging. And in other embodiments, a time until the scheduled usage may be proportional to the state of charge, may be a function of the state of charge, and/or may factor in an expected rate of energy consumption until the scheduled usage.

In a second example, the work machine may be scheduled based on a function of the location. In an embodiment, a time until the scheduled usage may be proportional to a distance between the work machine and the trolley network, may be a function of the distance, and/or may factor in an expected fuel consumption or energy consumption for traveling to the trolley network.

In a third example, the work machine may be scheduled according to the one or more assigned tasks. In an embodiment, the work machine may be scheduled to use the trolley network such that the exit time coincides with a start time of the next assignment. In another embodiment, a time until the scheduled usage may be inversely proportional to a priority of the assigned tasks.

And in other examples, some or all of the above considerations, and yet other possible considerations, may be used in combination in order to schedule the usage of the trolley network.

Moreover, the scheduled usage may also depend on the type of the work machine. In an embodiment, the work machine is a fuel cell electric vehicle having a rechargeable battery of relatively low capacity. According to a first strategy, the state of the charge may be easily repleted and thus take relatively low priority during the scheduling process, e.g. with respect to battery electric vehicles. According to a second strategy, the scheduled usage may prioritize one or more fuel electric vehicles based on their respective fuel cell fuel levels. In another embodiment, the work machine is a battery electric vehicle being having a rechargeable battery of relatively high capacity. According to a second strategy, the state of charge of the battery, the state of health of the battery, and/or an energy efficiency of the work machine make take relatively high priority. And in yet other strategies, a high capacity battery may receive less priority than a low capacity battery since it offers greater reserve power. In various embodiments, properties of the work machine, such as battery capacity, travel speed, powertrain efficiency, and other considerations may impact the scheduling process, where no limitation is intended by the present disclosure.

In step 460, electric power is supplied from the trolley network to the work machine, and may include allocating a power draw by the work machine (step 461) and distributing the power draw among the machine's functions (step 462). The step of allocating (step 461) may be measured as an instantaneous rate, i.e. in Watts, and/or as a total power draw throughout the duration of the route, i.e. in Watt-hours or Joules. Next, the power draw may be distributed (step 462) between charging the rechargeable battery and powering the propulsion motors, i.e. driving the tractive device. As with step 430 above, a number of exemplary strategies for step 460 are also provided below. It is worth noting that the instantaneous rate and the distribution of the power draw may not be constant throughout the duration of the route.

In a first example, the power draw may be fully maximized according to the specifications of the work machine and the trolley network. In other words, the battery may be supplied a maximum allowable or safe current; the propulsion motors and the tractive device may be supplied a maximum allowable or safe current; and any intervening components, such as the contact wire, the charging apparatus, the powertrain, etc. are each operating within allowable or safe limits.

In a second example, the power draw to the rechargeable battery may be optimized and/or prioritized. In various embodiments, the power draw may be allocated and distributed such that the rechargeable battery is charged as quickly as possible, such that the rechargeable battery is charged as fully as possible, such that the rechargeable battery is charged at an optimal rate for battery health, and/or some combination of the above. In the same or other embodiments, the power draw to the tractive device may be accordingly relegated, and a speed and/or energy efficiency of the work machine may be affected.

In a third example, the power draw to the tractive device may be optimized and/or prioritized. In various embodiments, the power draw may be allocated and distributed such that the work machine travels as quickly as possible, such that the work machine exits the trolley network at a time congruent with its assigned tasks, such that the machine travels at an optimal speed for energy efficiency, and/or some combination of the above. In the same or other embodiments, the power draw to the rechargeable battery may be accordingly relegated, and a state of charge and/or a productivity of the work machine may be affected.

In a fourth example, the work machine is specifically a fuel cell vehicle and the power draw may be allocated based on the fuel cell fuel level. In an embodiment, during the step of supplying electric power (460), a fuel cell of the work machine may be idled. In the same or other embodiments, the power draw to the work machine may be distributed such that the rechargeable battery is charged during the scheduled usage; and such that the tractive device is driven via electric power from the trolley network only. In some embodiments, the work machine may be supplied electric power such that the rechargeable battery is fully charged during the scheduled usage.

And in other examples, some or all of the above considerations, and yet other possible considerations, may be used in combination when supplying, allocating, and distributing electric power to the work machine. In an embodiment, the method 400 may further comprise optimizing for one or more predetermined criteria during the scheduled usage of the trolley network, during the course of the machine's assigned tasks, or even throughout the lifespan of the work machine (step 420). The criteria may include, among other possibilities, an energy efficiency of the work machine, such as a fuel efficiency or a cost of travel; a productivity of the work machine, e.g. as measured in widgets produced, freight transported, machine uptime, or other common units; and a depreciation of the work machine, such as a reduction in the state of health of the rechargeable battery.

In the same or other embodiments, the method 400 may further comprise optimizing for a reward function. For example, the reward function may assign a value to each of the above considerations, including but not limited to energy efficiency, productivity, and depreciation, and may consider other factors germane to the goals of the mine site. In various embodiments, the reward function may be predetermined, may be programmed by a human operator, and/or may be set according to specific applicational requirements. And in other embodiments, the reward function may be based on a machine learning algorithm, such as one employing reinforcement learning, supervised learning, or unsupervised learning techniques, which may or may not be updated in real-time In some embodiments, the method 400 may further comprise navigating the work machine to an entry point of the trolley network (step 440) and/or connecting the work machine and, more specifically, the charging apparatus, to the trolley network (step 450). In the same or other embodiments, the controller may utilize the location of the work machine to provide navigational instructions toward an entry point of the trolley network.

Figure 5:
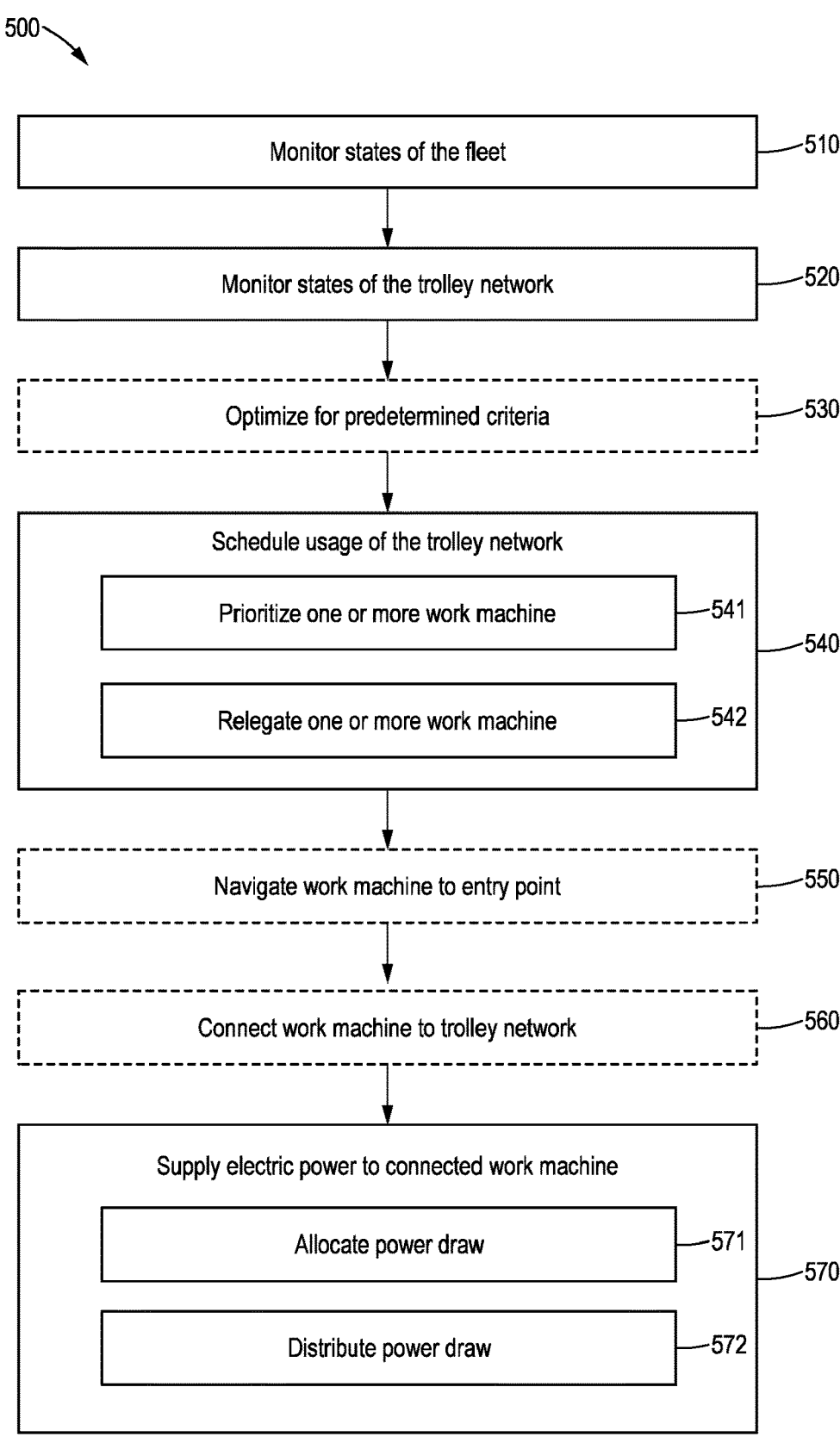
FIG. 5 is a flowchart illustrating a method of charging a fleet of work machines via a trolley network according to an embodiment of the present disclosure.

Turning now to FIG. 5, a method of charging a fleet of work machines via a trolley network is generally referred to by a reference numeral 500. As seen in FIG. 5, the method 500 may comprise monitoring a plurality of states of the fleet (step 510); monitoring a plurality of states of the trolley network (step 520); scheduling usages of the trolley network by one or more work machines (step 540); and supplying electric power from the trolley network to the connected work machines (step 570). It may be appreciated that the method 500 is related to the method 400 in several ways, but may include additional strategies to accommodate for scheduling and charging multiple work machines concurrently.

In some embodiments, each step of the method 500 may be operatively performed by the fleet controller. It should be noted that, while the method 400 may be operatively performed by the machine itself (i.e. the controller is included on the work machine), the method 500 may require an external fleet controller in bi-directional communication with each machine within the fleet. In various embodiments, the fleet controller may be located in a management station, may be located on the trolley network, may be located on a distributed computer, may be located on a single work machine within the fleet, and yet other possibilities.

In step 510, a plurality of states of the fleet are monitored, including at least a type of each work machine, a state of each rechargeable battery, a location of each work machine, and one or more assigned tasks of each work machine. In some embodiments, the plurality of states of the fleet may further include a state of health of each rechargeable battery, a priority of each assigned task, a fuel cell fuel level (if the machine is a fuel cell electric vehicle), and other possible states, where no limitations are intended herein. Furthermore, unlike step 410 in the method 400, step 510 may further include aggregated states of the fleet, such as global average or global total states of charge, global average states of health, global average fuel cell fuel levels, roster requirements for assigned tasks, and other possibilities.

In step 520, a plurality of states of the trolley network are monitored, including a maximum power output from the trolley network, a count of the connected work machines, and a power draw of each connected work machine. Consequently, the instantaneous power output from the trolley network and/or a saturation of the trolley network may also be known and monitored. In some embodiments, the plurality of states of the trolley network may further include a speed of each connected work machine, an expected duration of travel, and yet other possibilities.

The plurality of states may be relayed to the fleet controller through the first communication module of each work machine, the second communication module of the trolley controller, and a communication module of the trolley network. In various embodiments, the monitored states of both the fleet and the trolley network may be transferred in real-time or at predetermined intervals, depending on specific applicational requirements.

In step 540, one or more work machines are scheduled to use the trolley. In some embodiments, each scheduling may include an entry time, an exit time, and, consequently, a speed of travel throughout the route for each machine. The scheduled usages may be based on the plurality of states of the fleet and the network, and may further include prioritizing one or more work machines (step 541) and relegating one or more work machines (step 542) in a scheduling queue. A number of exemplary strategies for the scheduling processes are provided below.

In a first example, one or more work machines may be prioritized in the scheduling queue based on each machine's state of charge. In an embodiment, a work machine with a battery near depletion may be scheduled for immediate charging, and/or one or more work machines with the lowest states of charge may be prioritized within the scheduling queue. In the same or other embodiments, the priority within the scheduling queue may be proportional to each machine's state of charge, may be a function of each machine's state of charge, and/or may factor in an expected rate of energy consumption until the scheduled usage. Conversely, one or more work machines may be relegated in the scheduling queue based on their (relatively) full states of charge.

In a second example, one or more work machines may be scheduled based on each machine's location. In an embodiment, one or more work machines with the nearest location may be prioritized within the scheduling queue. In the same or other embodiments, the priority within the scheduling queue may be proportional to a distance between each work machine and the trolley network, may be a function of the distance, and/or may factor in an expected energy consumption for traveling to the trolley network. Conversely, one or more work machines may be relegated in the scheduling queue based on their (relatively) distal locations.

In a third example, one or more work machines may be scheduled based on each machine's one or more assigned tasks. In an embodiment, the work machines may be scheduled such that an exit time of each machine coincides with a start time of its next assignment, or may be scheduled as a function of the start time and/or duration of its next assignment. In another embodiment, one or more work machines may be scheduled based on each machine's priority of assigned tasks. One or more work machines with the most imminent assigned tasks and/or one or more work machines with the highest task priority may be prioritized within the scheduling queue. In some circumstances, a given task may have a roster requirement of machines working in conjunction. Accordingly, one or more machines may also be scheduled based on the roster requirement of each machine's assigned tasks. Those machines with shared assigned tasks may be prioritized within the scheduling queue and/or may be scheduled as close as possible to one another. Conversely, one or more work machines may be relegated in the scheduling queue based on their (relatively) low immediacy or low priority of assigned tasks.

The scheduled usages may further depend on the type of each work machine, whose characteristic fuel type, powertrain, tractive device, battery capacity, travel speed, and other factors may impact the scheduling process. In a fourth example, one or more work machines may be prioritized in the scheduling queue based on each machine's fuel cell fuel level, where applicable. And in other examples, some or all of the above considerations, and yet other possible considerations, may be used in combination in order to schedule the usages of the trolley network, where no limitation is intended herein.

As one or more work machines may be prioritized in scheduling queue, one or more work machines may necessarily be relegated as well. In addition to the examples discussed above, one or more work machines may be relegated, in effect, based on the states of the trolley network. In an embodiment, one or more work machines may be relegated in the scheduling queue based on the saturation of the trolley network.

In a fourth example, the step of scheduling usages of the trolley network (step 540) may further include a consideration for avoiding congestion of the trolley network. In an embodiment, one or more work machines may be scheduled such that their entry times are sufficiently spaced; such that that their exit times are sufficiently spaced; and/or such that a distance between each machine traveling on the route is sufficiently spaced. In the same or other embodiments, one or more work machines may be scheduled to avoid or decongest common 'rush' hours, or to avoid expected congestion stemming from the timing of assigned tasks.

In step 570, electric power is supplied from the trolley network to the connected work machines, including allocating a power draw by each connected work machine (step 571) and distributing each power draw between charging the rechargeable battery and powering the propulsion motors, i.e. driving the tractive device, of each work machine (step 572). A number of exemplary strategies for step 570 are provided below.

In a first example, the trolley network may be capable of supplying a maximum power draw to each connected work machine. In other words, for each connected work machine, the battery may be charged at a maximum allowable or safe current; the propulsion motors and the tractive device may be powered at a maximum allowable or safe current; and any intervening components are also operating within their allowable or safe limits, respectively.

However, in the following examples, the trolley network may not be capable of supplying the maximum power draw to each connected work machine. Accordingly, the power draw may need to be allocated among the connected work machines, and may be portioned according to a number of different strategies.

In a second example, power may be allocated to the one or more connected work machines based on a function of the battery capacity or the state of charge of each work machine. In various embodiments, each connected work machine may be supplied power proportional to its maximum power draw; each work machine may be supplied an equal share of the maximum power output of the trolley network; each work machine may be supplied electric power as a function of its battery capacity; and/or each work machine may be supplied electric power as a function of its state of charge.

In a third example, power may be allocated to the one or more connected work machines based on the assigned tasks and/or the priority of the assigned tasks of each work machine. In various embodiments, each connected work machine may be supplied power equal to or proportional to the needs of its assigned tasks; each connected work machine may be supplied power required to timely travel to the next assigned task; and/or each connected work machine may be supplied electric power as a function of the immediacy and/or the priority of its assigned tasks. In an embodiment, each connected work machine may also be allocated power based on the roster requirement of its assigned tasks. For example, one or more work machines having a shared assignment may be allocated an equivalent power draw, or may be allocated a power draw proportional to its battery capacity or its role within the shared assignment.

In a fourth example, power may be allocated to one or more connected work machines based on the fuel cell fuel level of each work machine (if the machine is a fuel cell electric vehicle).

It may be appreciated that the power draw allocated to each connected work machine may change as one or more work machines connect to or disconnect from the trolley network. In an embodiment, a saturated trolley network may accommodate another work machine by reducing the power draw to each presented connected work machine. Conversely, when a work machine exits the trolley network, the power draw allocated to the remaining connected work machines may be reallocated and/or increased. In various embodiments, the power draw to each connected work machine may be reapportioned in real-time, at predetermined intervals, or when key events occur, such as when a work machine connects to or disconnects from the network.

In addition to allocating the power draw to each connected work machine, step 570 may include distributing the power draw by each work machine between charging the rechargeable battery and driving the tractive device (step 572), for which a number of exemplary strategies are also provided below.

In a fourth example, the distribution of power draws to one or more connected work machines may prioritize charging the rechargeable battery. In various embodiments, the power draw may be distributed: such that a single connected work machine is fully charged; such that multiple connected work machines are fully charge; such that each connected work machine is equally or equitably charged; and/or such that each connected work machine is charged as a function of its assigned tasks or as a function of the priority of its assigned tasks.

In a fifth example, the distribution of power draws to one or more connected work machines may prioritize driving the tractive device. In various embodiments, the power draw may be distributed: such a single work machine travels at a maximum speed; such that multiple machines travel at a maximum speed; such that each connected work machine travels at an equal or equitable speed; such that the sum travel time is minimized; such that a productivity of the fleet is maximized; such that each connected machine exits the trolley at a reasonable time relative to the start time of its assigned tasks; and/or such that each connected machine travels at an optimal speed for energy efficiency.

In a sixth example, the distribution of power draws to one or more connected work machines may prioritize the state of health of the rechargeable battery and/or a depreciation of the work machine. In various embodiments, the power draw may be distributed: such that a single machine is charged at an optimal rate for battery health; such that each connected work machine is charged at an optimal rate for battery health; such that a single connected work machine travels at an optimal speed for machine depreciation; and/or such that each connected work machine travels at an optimal speed for machine depreciation. In some embodiments, the power draw may be distributed such that the state of charge of each rechargeable battery remains within an acceptable range. The acceptable range may vary according to the work machine and may, for example, have a lower bound of 5%, 10%, 15% or 20% of the total battery capacity and an upper bound of 80%, 85%, 90% or 95% of the total battery capacity.

In a seventh example, one or more work machines of the fleet are specifically fuel cell electric vehicles. In such circumstances, their fuel cells may be idled or shut-off when the work machine is connected to the trolley network. In an embodiment, the power draw may be distributed such that the rechargeable battery is charged (which may require relatively low power), and the remaining power draw is distributed toward driving the tractive device. In some embodiments, the work machine may be supplied electric power such that the rechargeable battery is fully charged during the scheduled usage.

And in other examples, some or all of the above considerations, and yet other possible considerations, may be used in combination when allocating and distributing electric power to the connected work machines.

In some embodiments, the step of supplying electric power (step 570) may further include a consideration for avoiding congestion of the trolley network. For example, one or more work machines may be allocated and distributed power such that their entry times into the trolley network are sufficiently spaced; such that their exit times out of the trolley network are sufficiently spaced; such that a distance between each machine is sufficiently spaced; and/or such that a slowdown of a single machine does not cause a 'jam' of the route.

In some embodiments, a connected work machine may be rejected from the trolley network during the middle of the route. Accordingly, the method 500 may comprise a step of adjusting the allocated power draw to the other connected work machines. Where the trolley network comprises a single-lane route, the adjustment of power draw allocation may consider the new speed of the rejected work machine. For example, the power draw distributed to the remaining, connected work machines may be adjusted in order to match the speed of the rejected work machine. In other embodiments, the trolley network may comprise a multi-lane route. Accordingly, the power draw by the rejected work machine may be reallocated to the remaining, connected work machines. However, the speed of the remaining, connected work machines, and the distribution of power draw to their tractive device, may be unaffected.

In an embodiment, the method 500 may further comprise optimizing for one or more predetermined criteria during the scheduled usage of the trolley network, during the course of fleet's assigned tasks, or even throughout the lifespan of the entire fleet (step 530). The criteria may include, among other possibilities, an energy efficiency of the fleet; a productivity of the fleet; and a depreciation of the fleet. In the same or other embodiments, the method 500 may further comprise optimizing for a reward function. For example, the reward function may assign a value to each of the above considerations, including but not limited to energy efficiency, productivity, and depreciation, and may further assign values to individual work machines and/or the fleet as a whole. The reward function may be predetermined, may be programmed by a human operator, and/or may be set according to specific applicational requirements. And in other embodiments, the reward function may be based on a machine learning algorithm, such as one employing reinforcement learning, supervised learning, or unsupervised learning techniques, which may or may not be updated in real-time.

In some embodiments, the method 500 may further comprise navigating one or more work machines to one or more entry points of the trolley network (step 550) and/or connecting one or more work machines and, more specifically, each machine's charging apparatus, to the trolley network (step 560). In the same or other embodiments, the fleet controller may utilize the location of the work machine to provide navigational instructions toward an entry point of the trolley network.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

The invention claimed is:

1. A fleet and trolley system comprising:
   a trolley network configured to connect to and supply electric power to one or more work machines, the trolley network including:
     a first terminus;
     a second terminus; and
     a contact line;
   a zero-emission work machine configured to intermittently connect to and draw electric power from the trolley network, the work machine including:
     a frame;
     a rechargeable battery;
     one or more propulsion motors;
     a tractive device;
     a charging apparatus;
     a positioning module; and
     a first communication module;
   a controller in operative communication with the work machine, the controller configured to manage:
     a scheduled usage of the trolley network by the work machine;
     a power draw by the work machine from the trolley network; and
     a distribution of the power draw between charging the rechargeable battery and driving the tractive device, wherein the controller is configured to monitor;
   a type of the work machine;
   a state of charge of the rechargeable battery;
   a location of the work machine; and
   one or more assigned tasks of the work machine.

2. The fleet and trolley system according to claim 1, wherein:
   the trolley network further includes a catenary;
   the charging apparatus further includes a pantograph; and
   the work machine is configured to connect to or disconnect from the trolley network at any point between the first terminus and the second terminus.

3. The fleet and trolley system according to claim 1, wherein the controller is included on the work machine.

4. The fleet and trolley system according to claim 1, further comprising:
   a plurality of zero-emission work machines, each work machine configured to intermittently connect to and draw electric power from the trolley network, each work machine including:
     a frame;
     a rechargeable battery;
     one or more propulsion motors;
     a tractive device;
     a charging apparatus;
     a positioning module; and
     a first communication module;

wherein the controller includes a fleet controller in operative communication with each work machine and configured to manage:
     scheduled usages of the trolley network by each work machine;
     power draws by each work machine from the trolley network; and
     distributions of each power draw between charging the rechargeable battery and driving the tractive device of each work machine.

5. The fleet and trolley system according to claim 4, wherein the fleet controller is further configured to monitor:
   a type of each work machine;
   a state of charge of each rechargeable battery;
   a location of each work machine; and
   one or more assigned tasks of each work machine.

6. The fleet and trolley system according to claim 5, wherein the controller or the fleet controller is further configured to monitor:
   a state of health of each rechargeable battery;
   a priority of each assigned task; and
   a saturation of the trolley network.

7. The fleet and trolley system according to claim 1, wherein the work machine is a battery electric vehicle or a fuel cell electric vehicle.

8. A method of charging a work machine via a trolley network comprising the steps of:
   monitoring a plurality of states of the work machine, the plurality of states including:
     a type of the work machine;
     a state of charge of a rechargeable battery;
     a state of health of the rechargeable battery;
     a location of the work machine; and
     one or more assigned tasks;
   scheduling a usage of the trolley network by the work machine based on the plurality of states;
   supplying electric power from the trolley network to the work machine, including:
     allocating a power draw by the work machine; and
     distributing the power draw between charging the rechargeable battery and driving a tractive device.

9. The method according to claim 8, wherein each step of the method is operatively performed by a controller included on the work machine.

10. The method according to claim 8, the step of scheduling the usage of the trolley network further including:
   scheduling the usage based on a function of the state of charge;
   scheduling the usage based on a function of the location; and/or
   scheduling the usage according the one or more assigned tasks.

11. The method according to claim 8, further comprising the step of optimizing for one or more of the following:
   an energy efficiency of the work machine;
   a productivity of the work machine; and
   a depreciation of the work machine.

12. The method according to claim 8, the step of supplying electric power further including:
   prioritizing the power draw to the rechargeable battery or prioritizing the power draw to the tractive device during the scheduled usage.

13. The method according to claim 8, the step of supplying electric power further including the following if the work machine is a fuel cell electric vehicle:
   idling a fuel cell of the work machine;

charging the rechargeable battery during the scheduled usage; and driving the tractive device via electric power supplied by the trolley network only.

14. A method of charging a fleet of work machines via a trolley network comprising the steps of:

monitoring a plurality of states of the fleet;

monitoring a plurality of states of the trolley network;

scheduling usages of the trolley network by one or more work machines based on the plurality of states, including:

prioritizing one or more work machines; and relegating one or more work machines;

supplying electric power from the trolley network to one or more connected work machines, including:

allocating a power draw by each connected work machine; and distributing each power draw between charging a rechargeable battery and driving a tractive device of each work machine wherein the controller is configured to monitor:

a type of the work machine;

a state of charge of the rechargeable battery;

a location of the work machine; and one or more assigned tasks of the work machine.

15. The method according to claim 14, wherein the plurality of states of the trolley network include the following:

a maximum power output;

a count of the connected work machines;

a power draw of each connected work machine; and a saturation of the trolley network.

16. The method according to claim 15, wherein the plurality of states of the fleet further include the following for each machine in the fleet:

a state of health of the rechargeable battery; and a priority of the assigned tasks;

wherein the plurality of states of the trolley network further include the following:

a speed of each connected work machine.

17. The method according to claim 16, the step of scheduling the usage of the trolley network further including:

prioritizing one or more work machines based on each machine's state of charge;

prioritizing one or more work machines based on each machine's location; and/or prioritizing one or more work machines based on each machine's assigned tasks, the priority of each machine's assigned tasks, and/or a roster requirement of each machine's assigned tasks.

18. The method according to claim 16, the step of supplying electric power from the trolley network further including:

allocating the power draw to one or more connected work machines based on a function of the state of charge of each machine;

allocating the power draw to one or more connected work machines based on the assigned tasks of each machine; and/or allocating the power draw to one or more connected work machines based on the priority of the assigned tasks or a roster requirement of the assigned tasks of each machine.

19. The method according to claim 16, the step of supplying electric power from the trolley network further including:

distributing the power draw to one or more connected work machines to prioritize charging the rechargeable battery;

distributing the power draw to one or more connected work machines to prioritize driving the tractive device; and/or distributing the power draw to one or more connected work machines to prioritize the state of health of the battery.

20. The method according to claim 14, wherein each step is operatively performed by a fleet controller in bi-directional communication with each work machine.

21. The method according to claim 14, further comprising the step of optimizing based on a reward function, wherein the reward function assigns a value to:

an energy efficiency of the fleet;

a productivity of the fleet; and a depreciation of the fleet.

22. The method according to claim 14, wherein:

the step of scheduling usages of the trolley network further includes:

avoiding congestion of the trolley network;

the step of supplying electric power from the trolley network further includes:

avoiding congestion of the trolley network.

23. The method according to claim 14, wherein the step of scheduling the usage of the trolley network further includes prioritizing one or more work machines based on a fuel cell fuel level if the machine is a fuel cell electric vehicle;

wherein the step of supplying electric power from the trolley network further includes allocating the power draw to one or more connected work machines based on the fuel cell fuel level if the machine is a fuel cell electric vehicle.

24. The method according to claim 14, the step of supplying electric power further including the following if the work machine is a fuel cell electric vehicle:

idling a fuel cell of the work machine;

charging the rechargeable battery during the scheduled usage; and driving the tractive device via electric power supplied by the trolley network only.

* * * * *